US008728245B2

(12) United States Patent
Dufresne et al.

(10) Patent No.: US 8,728,245 B2
(45) Date of Patent: May 20, 2014

(54) GELLED ADHESIVE REMOVER COMPOSITION AND METHOD OF USE

(75) Inventors: Ralph E. Dufresne, Auburn, WA (US); William M. Egan, Renton, WA (US)

(73) Assignee: The Boeing Company, Chicago, IL (US)

( * ) Notice: Subject to any disclaimer, the term of this patent is extended or adjusted under 35 U.S.C. 154(b) by 127 days.

(21) Appl. No.: 13/153,508

(22) Filed: Jun. 6, 2011

(65) Prior Publication Data

US 2011/0226283 A1 Sep. 22, 2011

Related U.S. Application Data

(62) Division of application No. 11/610,622, filed on Dec. 14, 2006, now Pat. No. 7,977,294.

(51) Int. Cl.

| | |
|---|---|
| ***B08B 7/04*** | (2006.01) |
| ***B08B 7/00*** | (2006.01) |
| ***C09D 9/00*** | (2006.01) |

(52) U.S. Cl.
USPC ................................ 134/18; 134/38; 510/200

(58) Field of Classification Search
USPC ......... 510/200, 201, 213, 245, 254; 134/25.4, 134/34, 38, 39, 40, 42
See application file for complete search history.

(56) References Cited

U.S. PATENT DOCUMENTS 3,983,047 A * 9/1976 Vinson .......................... 510/200
3,998,654 A * 12/1976 Falaas et al. ...................... 134/4
4,324,595 A 4/1982 Kaspizak
4,370,174 A 1/1983 Braithwaite, Jr.
4,556,509 A 12/1985 Demangeon et al.
4,617,251 A 10/1986 Sizensky
4,650,822 A 3/1987 Veazey et al.
4,732,695 A 3/1988 Francisco
4,780,235 A 10/1988 Jackson (Continued)

FOREIGN PATENT DOCUMENTS

DE 10 2004 063765 A1 7/2006
EP 0 584 692 A2 3/1994

(Continued)

OTHER PUBLICATIONS

Invista Product Wed Information, www.cleanersolutions.org/downloads/msds/472/DBE%20TDS-General.pdf, accessed Nov. 24, 2009.

(Continued)

*Primary Examiner* — Ling Choi
*Assistant Examiner* — Thuy-Al Nguyen
(74) *Attorney, Agent, or Firm* — Klintworth & Rozenblat IP LLC

(57) ABSTRACT

The present invention includes a process using environmentally friendly materials for the removal of adhesive residues from hard substrates, particularly vehicles, e.g., cars, trucks, buses, aerospace vehicles including airplanes, and the like. The process uses a novel adhesive remover composition comprising one or more non-halogenated organic solvents, a non-abrasive thickening agent, a surfactant, and a vapor-pressure modulating agent. The total Hansen Solubility Parameter (δt) at 25° C. for each of the non-halogenated organic solvents is from about 14 $MPa^{1/2}$ to about 24 $MPa^{1/2}$. The invention provides a cost effective, safe, environmentally friendly adhesive remover composition specifically formulated for removal of, e.g., pressure sensitive adhesive residues from large areas of aircraft composite and aluminum surfaces, as well as others.

17 Claims, 4 Drawing Sheets

(56) References Cited

U.S. PATENT DOCUMENTS

| | | | | |
|---|---|---|---|---|
| 4,905,371 | A | | 3/1990 | Pai |
| 5,015,410 | A | | 5/1991 | Sullivan |
| 5,015,506 | A | | 5/1991 | Purcell |
| 5,120,371 | A | | 6/1992 | Bolden et al. |
| 5,246,503 | A | | 9/1993 | Minick |
| 5,340,407 | A | | 8/1994 | Bolden et al. |
| 5,415,800 | A | * | 5/1995 | Motsenbocker ............. 510/201 |
| 5,525,254 | A | | 6/1996 | Reininger |
| 5,645,890 | A | | 7/1997 | MacDiarmid et al. |
| 5,698,044 | A | | 12/1997 | Graham et al. |
| 5,756,437 | A | | 5/1998 | Yamazaki et al. |
| 5,767,049 | A | | 6/1998 | Gaul |
| 5,894,854 | A | | 4/1999 | Miles |
| 5,932,530 | A | | 8/1999 | Radu et al. |
| 5,952,277 | A | | 9/1999 | Radu et al. |
| 5,990,065 | A | | 11/1999 | Vinson et al. |
| 6,069,122 | A | | 5/2000 | Vinson et al. |
| 6,090,238 | A | | 7/2000 | Smith |
| 6,153,571 | A | | 11/2000 | Komocki et al. |
| 6,265,367 | B1 | | 7/2001 | Callaghan et al. |
| 6,884,316 | B2 | | 4/2005 | Ono |
| 6,923,873 | B2 | | 8/2005 | Pageau et al. |
| 7,112,652 | B2 | | 9/2006 | Ford et al. |
| 2004/0005478 | A1 | | 1/2004 | Kendig et al. |
| 2005/0201890 | A1 | | 9/2005 | Kendig et al. |
| 2007/0049510 | A1 | | 3/2007 | Fujii et al. |

FOREIGN PATENT DOCUMENTS

| | | | |
|---|---|---|---|
| EP | 1382721 | A1 | 1/2004 |
| GB | 2 058 122 | A | 4/1981 |
| GB | 2 393 908 | A | 4/2004 |
| WO | 2005 037972 | A1 | 4/2005 |

OTHER PUBLICATIONS

ASTM Standard Test Method D4752-03, "Measuring MEK Resistance of Ethyl Silicate (Inorganic) Zinc-Rich Primers by Solvent Rub", ASTM International, West Conshohocken, Pennsylvania (Mar. 2003).

Charles M. Hansen, "Solubility Parameters," pp. 383-394, CRC Press, Boca Raton, Florida (2000).

* cited by examiner

GELLED ADHESIVE REMOVER COMPOSITION AND METHOD OF USE

CROSS REFERENCE TO RELATED APPLICATION

This application is related to application Ser. No. 11/610,622 entitled "GELLED ADHESIVE REMOVER COMPOSITION AND METHOD OF USE," now allowed and U.S. patent application Ser. No. 11/610,529 entitled "COMPOSITION AND METHOD FOR REMOVING ADHESIVE RESIDUE," now U.S. Pat. No. 7,759,298, filed concurrently herewith and incorporated herein by reference in its entirety.

FIELD OF THE INVENTION

The present invention includes a process using environmentally friendly materials for the removal of adhesive residues from hard substrates, particularly vehicles, e.g., cars, trucks, buses, aerospace vehicles including airplanes, and the like. The process uses a novel adhesive remover composition comprising one or more non-halogenated organic solvents, a non-abrasive thickening agent, a surfactant, and a vapor-pressure modulating agent. The total Hansen Solubility Parameter ("δt" or "HSP") at 25° C. for each of the non-halogenated organic solvents is from about 14 $MPa^{1/2}$ to about 24 $MPa^{1/2}$. The invention provides a cost effective, safe, environmentally friendly adhesive remover composition specifically formulated for removal of, e.g., pressure sensitive adhesive residues from large areas of aircraft composite and aluminum surfaces, as well as others.

BACKGROUND OF THE INVENTION

Conventional methods for removing adhesive residues, e.g., associated with the removal of vinyl decals from hard surfaces, e.g., auto, truck, bus, railroad, marine, aircraft bodies, and the like, are often time consuming, expensive, inefficient, and require the use of environmentally hazardous materials. For example, using art-recognized techniques, vinyl decals are often removed by careful application of heat via a heat gun and scraping to remove most of the decal and adhesive. A typical method of removing remaining adhesive residue is to wipe it away with a solvent-soaked rag. This method may be acceptable for cleaning small areas, but it is impractical for cleaning large areas, such as an airplane wing.

Furthermore, many commercially available adhesive remover compositions contain chlorinated organic solvents such as methylene chloride or carbon tetrachloride (a CFC known to damage stratospheric ozone), or they are alkaline, containing high quantities of potassium or sodium hydroxide. Several commercial products exist that purport to be useful for removing labels, gum, masking tape, and the like from nonabsorbent surfaces. While such products may be free of halogenated organic solvents, they are nevertheless liquids, and therefore their use is limited to small-scale applications in which the liquid can be contained. Such adhesive remover compositions are undesirable for large-scale industrial use.

The removal of adhesive residue from the exterior surfaces of airplanes, which may be made of composite materials, present special technical problems. For example, it would be impractical to apply liquids to the underside of an airplane wing (having surface areas of up to 2000 $ft^2$ or greater) because dripping liquid would contaminate the work area. Large volumes of free-flowing (i.e., liquid) organic solvents are undesirable because of the risk of fire or environmental contamination, protection of personnel, and the need for hazardous waste disposal. Adhesive residue removing compositions for use on the exterior surfaces of airplanes should not cause mechanical damage to adjacent or underlying structures and finishes. In addition, chemical attack or degradation of adjacent or underlying substrates and finishes including primer coatings should not occur. In order to be practical, any method of removing adhesive residues should ideally conclude with a water-based wash step, such as washing with soap and water. Furthermore, an adhesive removal method should be applicable and practical for horizontal, vertical, and overhead surfaces. The extensive use of carbon composite materials on new airplanes imposes heretofore unknown restrictions on chemical cleaning materials. Most of the cleaners, strippers, and other materials used on conventional aluminum aircraft surfaces are not compatible with composite materials.

There is no known, cost effective, environmentally compatible, or practical method or material for accomplishing removal of adhesive residues from large composite aircraft surfaces on the scale now required. There exists a need for a fast, safe, and effective process for removing adhesive residue remaining after removal a decal, appliqué, tape, etc.

SUMMARY OF THE INVENTION

The present invention includes a process using environmentally friendly materials for the removal of adhesive residues from hard substrates, particularly vehicles, e.g., cars, trucks, buses, aerospace vehicles including airplanes, and the like. The process uses a novel adhesive remover composition comprising one or more non-halogenated organic solvents, a non-abrasive thickening agent, a surfactant, and a vapor-pressure modulating agent. The total Hansen Solubility Parameter ("δ" or "HSP") at 25° C. for each of the non-halogenated organic solvents is from about 14 $MPa^{1/2}$ to about 24 $MPa^{1/2}$. The invention provides a cost effective, safe, environmentally friendly adhesive remover composition specifically formulated for removal of, e.g., pressure sensitive adhesive residues from large areas of aircraft composite and aluminum surfaces, as well as others.

The present invention overcomes the above-noted deficiencies of known methods and materials, and it provides for the reduced use of large volumes of organic solvents; limited mechanical damage to adjacent or underlying structures and finishes, especially when used to remove adhesive residues from airplane surfaces; limited chemical attack or degradation of adjacent or underlying substrates and finishes including primers; compatibility with a final optional water-based wash step (e.g., with soap and water) or washing with any other acceptable cleaning solution; and suitability for use on horizontal, vertical, and overhead surfaces.

In an exemplary embodiment, the invention provides a method for removing adhesive residue from a substrate, including the steps of providing an adhesive remover composition comprising one or more non-halogenated organic solvents, each of which has a total Hansen Solubility Parameter at 25° C. of about 14 $MPa^{1/2}$ to about 24 $MPa^{1/2}$. The adhesive remover composition further includes a non-abrasive thickening agent, a surfactant, and a vapor-pressure modulating agent. An adhesive remover composition may also include an absorbable indicator dye. According to a method of the invention, an adhesive remover composition is applied to a substrate that has an adhesive residue adhering thereto; followed by a step of waiting for a sufficient amount of time to lapse during which the adhesive residue becomes incorporated into the adhesive remover composition; followed by removing the adhesive remover composition to produce a cleaned substrate; and inspecting the cleaned substrate.

The amount of time during which the adhesive remover composition is in contact with the substrate depends on the nature of the adhesive residue, the relative amount and identity of the solvent, and the like. The length of time should be sufficient to permit the solvent to soften the adhesive residue. Suitable times include but are not limited to 10 minutes, 20 minutes, 30 minutes, or longer, but not so long that the adhesive remover composition becomes substantially dry. Generally, the greater the amount of the vapor-pressure modulating agent in an adhesive remover composition of the invention, the lower the effective vapor pressure of the solvent. Greater amounts of vapor-pressure modulating agent, e.g., glycerine, therefore permit longer incubation periods.

The invention also relates to a novel adhesive remover composition. An adhesive remover composition of the invention may have viscosity and handling characteristics adapted for mechanized application to horizontal, vertical, and overhead surfaces, such as are encountered in major aircraft maintenance. In preferred embodiments of the invention, an adhesive remover composition effectively removes adhesive residue with minimal substrate damage or complications to nearby surfaces or equipment. In an embodiment, an absorbable indicator (tracer) dye within the adhesive remover composition permits rapid visual evaluation of process effectiveness. Other features of the invention include an adhesive remover composition having improved flammability, explosion, and health characteristics. In another aspect, an adhesive remover composition of the invention may be compatible with common waste treatment and disposal methods.

The methods and adhesive remover compositions of the present invention overcome prior art deficiencies. Other features and advantages of the present invention will be apparent from the following more detailed description of preferred embodiments, taken in conjunction with the accompanying drawings, which illustrate, by way of example, the principles of the invention.

DETAILED DESCRIPTION OF THE INVENTION

Figure 1:
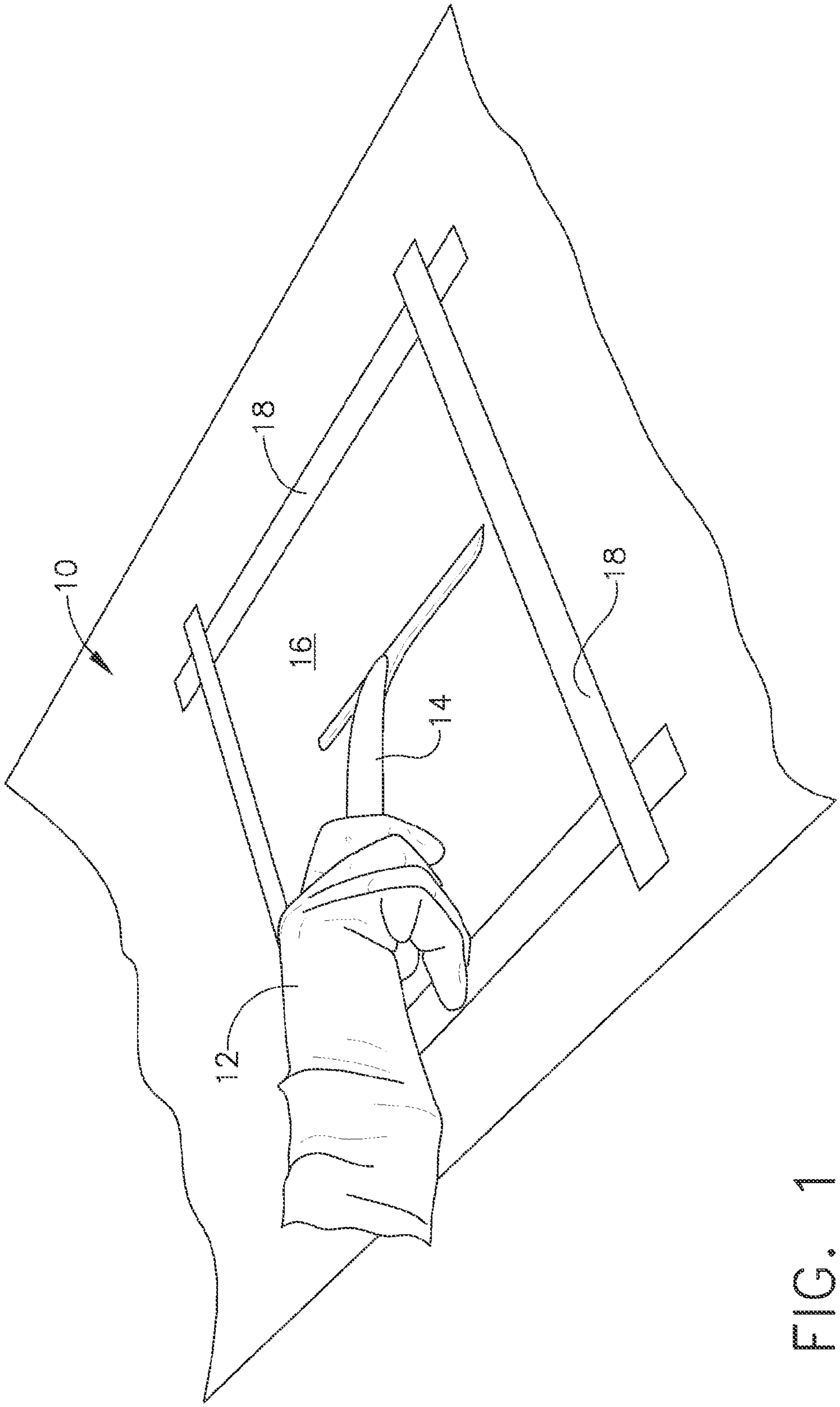
FIGS. 1-4 depict steps of an example method of removing adhesive residue according to the invention.

Referring to the accompanying drawings, in FIG. 1 a sample substrate having an adhesive residue adhering thereto is fixed to a workbench (10) by tape (18) and then a thin coat (about 1 cm thickness) of adhesive remover composition (16) is applied by hand (12) using an applicator tool (14). For example, the substrate, which may be aluminum or graphite epoxy composite, may previously have had a decal that was removed by scoring it into strips, heating it with heat gun, and then peel strips away from the substrate.

Figure 2:
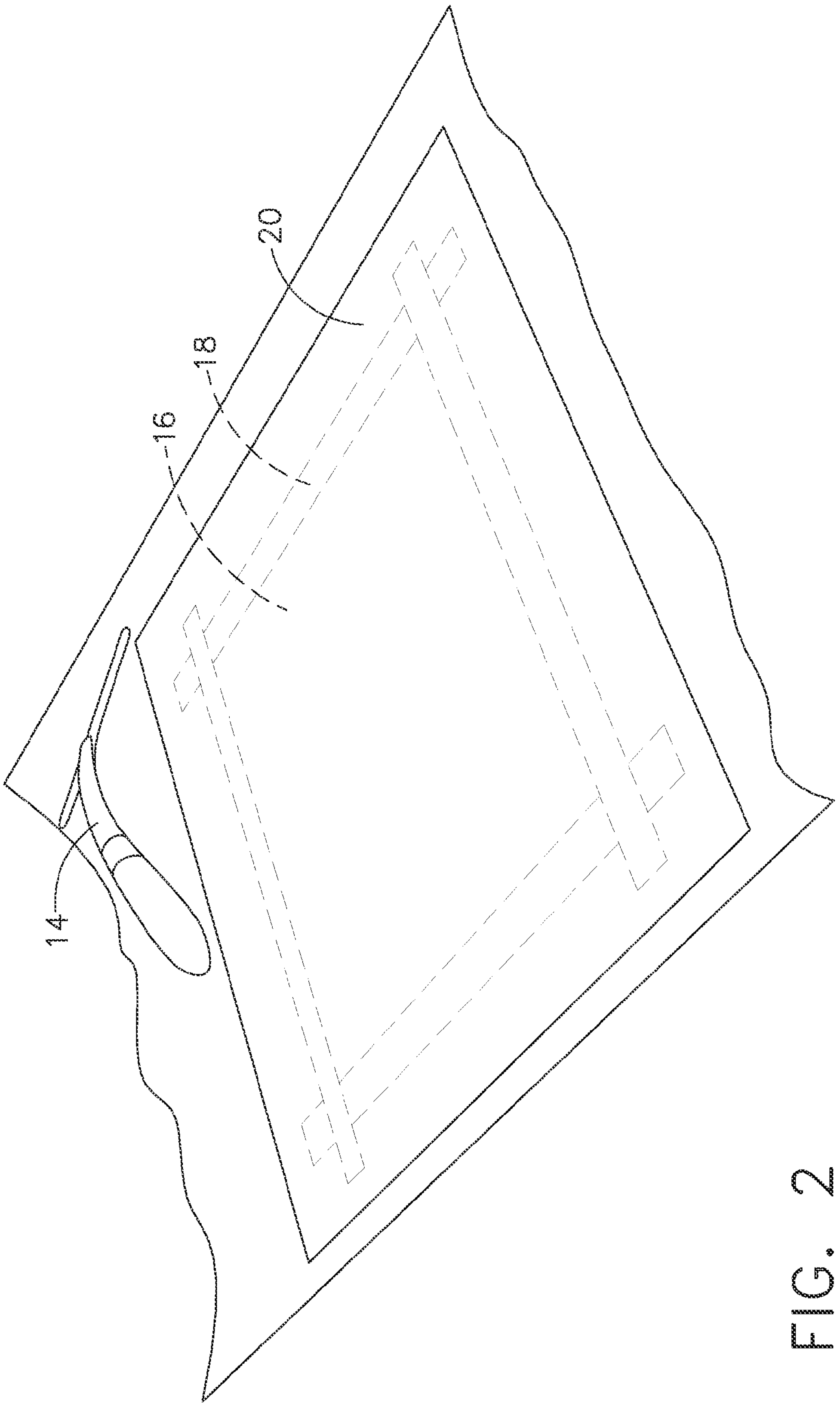

FIG. 2 depicts a subsequent step, in which an optional drop cloth (20) is laid down over the coated sample substrate, and approximately twenty minutes is permitted to lapse to facilitate infiltration of the adhesive remover composition (16) into the adhesive residue. The optional drop cloth (20) may prevent excessive or premature drying of the adhesive remover composition (16).

Figure 3:
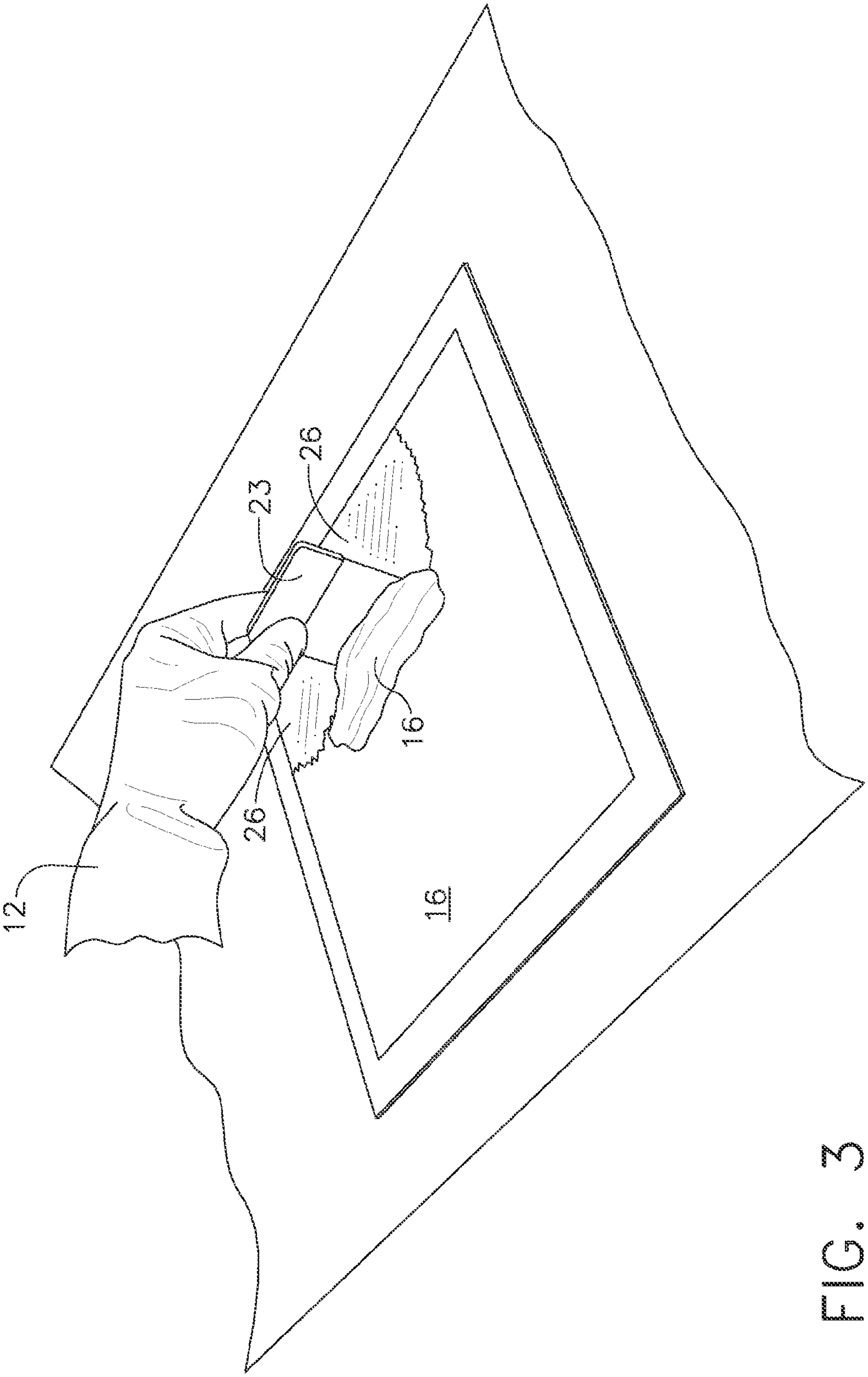

FIG. 3 depicts an additional step, in which the adhesive remover composition (16) is scraped off the substrate by hand (12) using a scraping tool (23) to reveal a cleaned substrate (26), which is substantially free of adhesive residue.

Figure 4:
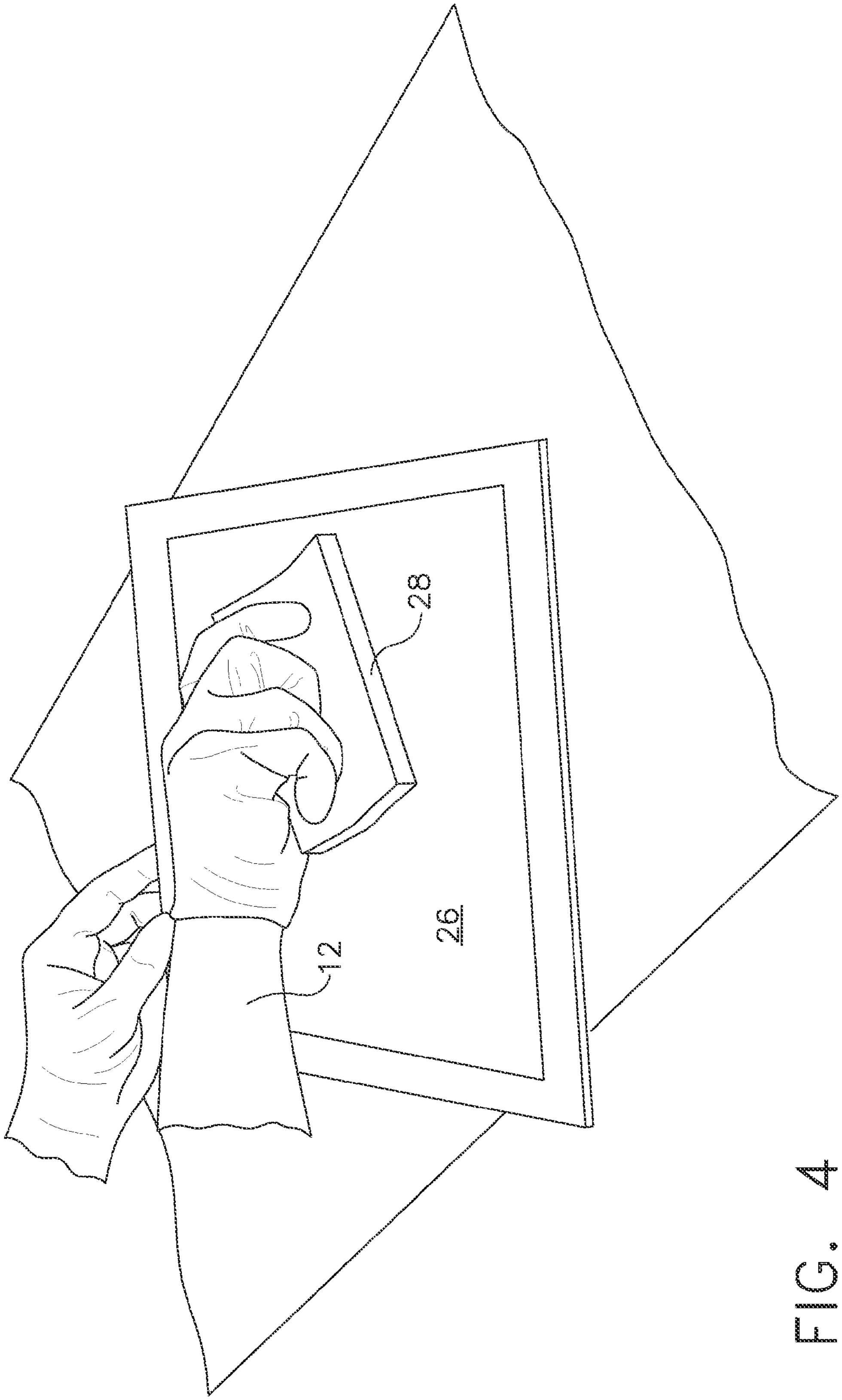

FIG. 4 depicts a final step of removing adhesive residue according to the invention, in which a cleaned substrate (26) is cleaned with a non-abrasive (e.g., nylon) scrubbing pad (28) using an aqueous solution of liquid (hand) dish washing detergent and tap water.

An adhesive is any substance that is capable of bonding other substances or components together by surface attachment. Adhesives typically comprise low molecular mass plasticizers, glues, binding agents, and other such materials, which may include a polymer, copolymer, or a combination thereof, which are essentially responsible for the mechanical, adhesive, and cohesive properties. When such adhesives are removed from various surfaces, especially after long-term use, they often leave behind marks, discolorations, and debris (e.g., adhesive residue). Although many adhesives do not cause mechanical destruction of the substrate at the time of fastening or of detachment, they nevertheless leave the fastening site in an unsightly or unusable state.

Several types of adhesives exist, including drying adhesives, contact adhesives, hot adhesives, reactive adhesives, and pressure sensitive adhesives. Drying adhesives, e.g., glues such as white glue and rubber cements, are typically a mixture of ingredients, usually polymers, dissolved in a solvent; as the solvent evaporates, the adhesive hardens. Contact adhesives must be applied to both surfaces and allowed to dry before the two surfaces are pushed together; but once the surfaces are pushed together the adhesive bond forms very quickly, and it is usually not necessary to apply pressure. Hot adhesives, also known as thermoplastic adhesives or hot melt adhesives, are thermoplastics that are applied hot, e.g., with a glue gun, and simply allowed to harden as they cool. Reactive adhesives work by chemical bonding with the surface material, and they are applied in thin films, which are less effective when there is a secondary goal of filling gaps between the surfaces. Reactive adhesives include two-part epoxy and isocyanate adhesives.

Pressure sensitive adhesives, e.g., acrylic, silicone, and natural and synthetic rubber, as well as combinations thereof, form a bond by the application of light pressure to join components. The bond forms because the adhesive is soft enough to conform to the microscopic surface features of the substrate. The bond has strength because the adhesive is hard enough to resist flow when stress is applied to the bond. Once the adhesive and the joined components are in close proximity, molecular interactions such as van der Waals forces produce a strong union. Pressure sensitive adhesives may be used for permanent and removable applications. Some high performance permanent pressure sensitive adhesives exhibit high adhesion values and can bond kilograms of weight per square centimeter of contact area, even at elevated temperature. Permanent pressure sensitive adhesives may be initially removable and build adhesion to a permanent bond after several hours or days. Some removable adhesives are designed to repeatedly stick and unstuck, and they have low adhesion and generally can not support much weight. Pressure sensitive adhesives may be low viscosity polymers that are coated and then reacted with radiation to increase molecular weight and form the adhesive; or they may be high viscosity materials that are heated to reduce viscosity enough to allow coating, and then cooled to their final state.

An example embodiment of the invention includes a multistep process for removing an adhesive residue, especially a pressure sensitive adhesive residue, from a substrate comprising the steps of providing an adhesive remover composition comprising one or more non-halogenated organic solvents, a non-abrasive thickening agent, a surfactant, and a vapor-pressure modulating agent, wherein the total Hansen Solubility Parameter at 25° C. for each of the non-halogenated organic solvents is from about 14 $MPa^{1/2}$ to about 24 $MPa^{1/2}$. The method also includes a step of applying the adhesive remover composition to a substrate that has an adhesive residue adhering thereto. A sufficient amount of time is permitted to lapse during which the adhesive residue softens and becomes incorporated into the adhesive remover composition. The adhesive remover composition is removed to produce a cleaned substrate. The method may also include the step of washing the cleaned substrate with an aqueous solution, such as tap water and liquid dish washing detergent or any other solvent or cleaning solution. In, e.g., arid regions of the world where use of an aqueous solution is not practical, a non-aqueous solution such as a non-halogenated organic solvent may be used. Adhesive residues incorporated into the adhesive remover composition may not flush with water, and therefore after application they should be scraped off, along with incorporated residue, and then disposed of as solvent-containing waste.

The invention also relates to an adhesive remover composition comprising one or more non-halogenated organic solvents, a non-abrasive thickening agent, a surfactant, and a vapor-pressure modulating agent, wherein the total Hansen Solubility Parameter at 25° C. for each of the non-halogenated organic solvents is from about 14 $MPa^{1/2}$ to about 24 $MPa^{1/2}$. In another embodiment of the invention, the total Hansen Solubility Parameter at 25° C. for each of the one or more non-halogenated organic solvents is from about 18 $MPa^{1/2}$ to about 20 $MPa^{1/2}$. In yet another embodiment, the total Hansen Solubility Parameter at 25° C. for each of the one or more non-halogenated organic solvents is from about 14 $MPa^{1/2}$ to about 19 $MPa^{1/2}$. In another embodiment, the invention includes an adhesive remover composition comprising two or more non-halogenated organic solvents. In some cases, a binary solvent system may be preferred; that is, the adhesive remover composition comprises two non-halogenated organic solvents, which may have non-identical HSP values. When a binary solvent system is used, the difference in HSP values of the solvents may be in the following range: $0<(HSP_{Solvent1}-HSP_{Solvent2})\leq 6$, among others. Some narrower subranges include $0<(HSP_{Solvent1}-HSP_{Solvent2})\leq 2$ and $4<(HSP_{Solvent1}-HSP_{Solvent2})\leq 6$. When such an adhesive remover composition is provided in a solvent-free or concentrated form, it may be reconstituted with non-halogenated organic solvents prior to use.

The non-halogenated organic solvents used in the adhesive remover composition may be described in terms of their Hansen Solubility Parameters which are known to those skilled in the art. Hansen Solubility Parameters were developed to characterize solvents for the purpose of comparison. Each of three parameters—dispersion (δd), polar (δp), and hydrogen bonding (δh)—represents a different characteristic of a given solvent. The total Hansen Solubility Parameter (δt), which is the square root of the sum of the squares of the three parameters, provides a description of the solvency of particular organic solvents. See, "Hansen Solubility Parameters—A Users Handbook," Charles M. Hansen, CRC Press, Boca Raton, Fla. (2000). The inventors have discovered that adhesive remover compositions containing non-halogenated organic solvents having a total Hansen Solubility Parameter between about 14 $MPa^{1/2}$ and about 24 $MPa^{1/2}$ (e.g., between about 18 $MPa^{1/2}$ and about 20 $MPa^{1/2}$ or between about 14 $MPa^{1/2}$ and about 19 $MPa^{1/2}$) are preferred for removing pressure sensitive adhesive residues.

The non-halogenated organic solvents are believed to decrease the viscosity of the adhesive remover composition and to dissolve into the adhesive residue and thereby soften it and enable its subsequent removal. The non-halogenated organic solvents may be any suitable non-halogenated solvent including the following (total Hansen Solubility Parameter, $\delta t/MPa^{1/2}$, in parentheses): n-butane (14.1), isooctane (14.3), n-pentane (14.5), n-hexane (14.9), n-heptane (15.3), n-octane (15.5), oleic acid (15.6), diethyl ether (15.8), n-dodecane (16.0), methylcyclohexane (16.0), isobutyl isobutyrate (16.5), cyclohexane (16.8), isobutyl acetate (16.8), diisobutyl ketone (16.9), methyl isobutyl ketone (17.0), isoamyl acetate (17.1), methyl isoamyl ketone (17.4), N-butyl acetate (17.4), stearic acid (17.6), ethyl benzene (17.8), diethyl carbonate (17.9), o-xylene (18.0), p-diethyl benzene (18.0), diethyl ketone (18.1), ethyl acetate (18.1), toluene (18.2), benzene (18.6), methyl acetate (18.7), ethyl formate (18.7), cyclohexylamine (18.9), styrene (19.0), methyl ethyl ketone (19.0), dibenzyl ether (19.3), tetrahydrofuran (19.4), cyclohexanone (19.6), isophorone (19.9), acetone (20.0), 2-ethoxyethyl acetate (20.0), napthalene (20.3), diethylene glycol monobutyl ether (20.4), 1-decanol (20.4), 1,4-dioxane (20.5), 2-nitropropane (20.6), diacetone alcohol (20.8), ethylene glycol monobutyl ether (20.8), acetic acid (21.4), morpholine (21.5), methyl salicylate (21.7), acetophenone (21.8), pyridine (21.8), benzoic acid (21.8), quinoline (22.0), diethylene glycol monomethyl ether (22.0), nitrobenzene (22.2), 2-butanol (22.2), diethylene glycol monoethyl ether (22.3), cyclohexanol (22.4), analine (22.6), nitroethane (22.7), isobutanol (22.7), m-cresol (22.7), diethyl sulfate (22.8), N-methyl-2-pyrrolidone (22.9), 1-butanol (23.1), 2-propanol (23.5), ethylene glycol monoethyl ether (23.5), and benzyl alcohol (23.8).

In preferred embodiments, the adhesive remover composition is essentially free (e.g., less than 1% by weight, or less than 0.1% by weight, or even about 0% by weight) of halogenated organic solvents, such as methylene chloride, chloroform, and carbon tetrachloride (or other chlorinated hydrocarbons); and the adhesive remover composition is readily dispersible in water.

The thickening agent of an adhesive remover composition of the invention may be any inert colloidal solid material that disperses completely in water, such as fumed silica, cellulose, or a cellulose derivative, e.g., cellulose ethers, such as hydroxypropyl methyl cellulose, hydroxypropyl ether cellulose, hydroxymethyl cellulose, or a combination thereof. Preferred thickening agents are non-abrasive, i.e., adhesive remover compositions of the invention preferably do not cause the substrate to be scratched or marred when used according to the methods described herein. An example thickening agent is CARBOSIL®, which is a trademark of Polymer Technology Group, Inc. (Berkeley, Calif.) for fumed silica.

The surfactant of an adhesive remover composition of the invention may be a combination of anionic surfactants (e.g., sodium dodecyl sulfate, ammonium lauryl sulfate, and sodium laureth sulfate) and nonionic surfactants (e.g., octyl glucoside, decyl maltoside, cetyl alcohol, and oleyl alcohol), such as those commonly found in liquid (hand) dish washing detergent. See, e.g., U.S. Pat. Nos. 4,556,509, 5,990,065, and 6,069,122, all of which are incorporated herein by reference. An example surfactant is JOY® liquid dish washing detergent, which is a trademark of The Procter & Gamble Company (Cincinnati, Ohio).

For example, suitable anionic detergents include $C_8$-$C_{18}$ alkyl sulfates, sulfonates, and carboxylates, especially alkyl sulfates containing 10-16 carbons in the alkyl group; $C_9$-$C_{15}$ alkylbenzene sulfonates wherein the alkyl group is either a straight chain or a branched chain, such as sodium dodecylbenzene sulfonate; $C_8$-$C_{22}$ olefin sulfonates, especially olefin sulfonates containing from 12-22 carbon atoms in the alkenyl group such as $C_{14-17}$ olefin sulfonate; $C_8$-$C_{18}$ alkyl ether ethylenoxy sulfates of the formula $R(OC_2H_4)_nOSO_3M$, wherein n is 1-12 and preferably 1-6, R is an alkyl group containing 8-18 carbon atoms and preferably 10-16 carbons, and M is a cation, preferably sodium or ammonium, such as ammonium lauryl triethenoxy ether sulfate; $C_{10}$-$C_{20}$ paraffin sulfonates especially alkane sulfonates containing 14-17 carbon atoms in the alkyl group, such as sodium $C_{14-17}$ paraffin sulfonate; $C_6$-$C_{12}$ phenyl ether polyethylenoxy sulfates, especially sulfonates having 8-12 carbons in the alkyl group, such as ammonium nonylphenyl tetraethenoxy ether sulfate; $C_8$-$C_{12}$ alkyl sulfonacetates corresponding to the formula $RO_2CH_2SO_3M$, wherein R is a $C_8$-$C_{18}$ alkyl especially sulfoacetates containing 12-16 carbon atoms in the alkyl group; N-mono-$C_8$-$C_{22}$ alkyl or alkenyl, including alkyl or alkenyl groups interrupted by an ether or amido group, sulfosuccinates, including disodium N-mono-$C_8$-$C_{18}$ acylisopropanolamidnosulfosuccinate, disodium lauryl sulfosuccinate, and N-monooleylisopropanolamidosulfosuccinate; N—$C_8$-$C_{18}$ acyl taurines, especially taurates containing 12-14 carbon atoms in an acyl group; and O—$C_8$-$C_{18}$ acyl isethionates, especially isethionates containing 12-14 carbon atoms in an acyl group.

Example nonionic surfactants include the ethoxylated fatty alcohols having 8-18 carbon atoms; ethoxylated alkylphenols having 6-12 carbons in the alkyl group; ethoxylated fatty alkanolamides having the structure $R^1CONR^2R^3(EtO)_x$, wherein $R^1CO$ is an acyl group containing 6-18 carbon atoms, $R^2$ is an H, $CH_3$, or $CH_2CH_2OH$ group, $R^3$ is a $CH_3$, $CH_2CH_2OH$, or a $CH_2CHOHCH_3$ group, and x is an integer from 0-20; and ethoxylated lanolin derivatives and ethoxylated sorbitans, including fatty acid esters of sorbitol having 10-18 carbon atoms in the fatty acid group. Other suitable nonionic detergents are the trialkyl polar amine oxides having the formula $R^1R^2R^3N{\rightarrow}O$ wherein $R^1$ is a $C_8$-$C_{18}$ alkyl, alkenyl, or hydroxy alkyl group and $R^2$ and $R^3$ are each methyl, ethyl, propyl, ethanol, or propanol or $R^2$ and $R^3$ are joined together with the nitrogen atom to form a morpholino group, such as lauric-myristic monoethanolamide, lauric-myristic diethanolamide, and lauryl dimethyl amine oxide.

The addition of vapor-pressure modulating agent to an adhesive remover composition is believed to reduce the vapor pressure of the non-halogenated organic solvent(s) and therefore to increase the drying time so that sufficient time may lapse during which the solvent(s) soften the adhesive residue. The vapor-pressure modulating agent is soluble in the non-haloganated organic solvents, non-reactive, and causes a reduction in the vapor pressure of the non-halogenated organic solvents. In an embodiment, the vapor-pressure modulating agent is a non-ionic liquid that has a boiling point of greater than about 100° C. at about 20 torr, such as glycerine (HSP=36.1), which has a boiling point of 182° C. at 20 torr. Further examples include non-ionic liquids that have a boiling point of greater than about 100° C. at ambient pressure (760 torr) and an HSP of greater than about 30, such as ethylene glycol (b.p.=192° C. at ambient pressure, HSP=32.9), propylene glycol (b.p.=189° C. at ambient pressure, HSP=30.2), and water (b.p.=100° C. at ambient pressure, HSP=47.8).

An adhesive remover composition of the invention may further comprise an absorbable indicator dye, which absorbs into, or adsorbs onto (which is used interchangeably herein), the adhesive residue upon application. When an adhesive remover composition of the invention comprises an absorbable indicator dye the cleaned substrate may be inspected for the presence of the retained absorbable indicator dye, which indicates the presence of remaining adhesive residue. Generally, only a small quantity of absorbable indicator dye is necessary, e.g., less than 1% by weight, or even less than 0.1% by weight.

The absorbable indicator dye of an adhesive remover composition, examples of which include methylene blue and food coloring, is absorbed into an adhesive residue when used in a method of the invention. An absorbable indicator dye should be soluble in the solvent components of the adhesive remover composition, and the dye should be absorbed into (or adsorbed onto) the adhesive residue that is being removed so that it can function as an indicator for completeness of residue removal. When an adhesive remover composition is removed from a substrate in accordance with the methods described herein, the presence of any dye on the substrate indicates that all adhesive residues have not been completely removed, and therefore the method should be repeated.

Many absorbable organic and organometallic indicator dyes, especially blue-colored dyes, are useful for general applications, i.e., where the substrate is not blue. The dye is observable indicator of remaining adhesive residue when there exists a color contrast between the substrate and the absorbed dye. In a typical embodiment, the other components of an adhesive remover composition are white or colorless. The indicator dye may therefore be customized for the unique requirements of specific applications. Several useful dyes of various colors are commercially available from Eager Plastics, Inc. (Chicago, Ill.), including “Hi-Bright Red,” “Ruby Red,” “Old Rose,” “Scarlet Red,” “Shocking Pink,” “Magenta,” “Violet,” “Bright Purple,” “Bright Orange,” “Honey Brown,” “Light Brown,” “Brilliant Blue,” “Royal Blue,” “Turquoise,” “Kelly Green,” “Lime Green,” “Fluorescent Yellow,” “Lemon Yellow,” “Fluorescent Lime,” “Avocado Green,” and “Aztec Gold.” Further example absorbable indicator dyes include food coloring, such as brilliant blue FCF (FD&C Blue No. 1), indigotine (FD&C Blue No. 2), fast green FCF (FD&C Green No. 3), allura red AC (FD&C Red No. 40), erythrosine (FD&C Red No. 3), tartrazine (FD&C Yellow No. 5), and sunset yellow FCF (FD&C Yellow No. 6). Other examples of absorbable indicator dyes may be found in the U.S. Food and Drug Administration’s list of substances Generally Recognized As Safe (“GRAS”), the Food Additive Status List, and the Color Additive Status List.

The relative quantities of the components of an adhesive remover composition of the invention are selected so that the composition is efficacious in the methods described herein. An example adhesive remover composition comprises less than about 75% by weight one or more non-halogenated organic solvents, about 5% to about 10% by weight non-abrasive thickening agent, less than about 10% by weight vapor-pressure modulating agent, less than about 1% by weight absorbable indicator dye, and less than about 5% by weight other ingredients, including surfactant, etc. For use in large-scale industrial applications, the relative amounts of the components may be selected in order to produce a composition having a viscosity of about 500 to about 1000 poise (e.g., 600 or 700 poise), in which case it may be readily applied to a large substrate such as the underside of an airplane wing using an airless paint gun. In such applications, the adhesive remover composition should have sufficiently high viscosity to cling to overhead or vertical surfaces but thin enough for spray application with an airless pump. The amount of vapor-pressure modulating agent, e.g., glycerine, is present in sufficient quantity to reduce the vapor pressure of the composition so that it does not dry before adhesive residues have been softened.

Further components of an adhesive remover composition of the invention may include additives, such as pH modulating (i.e., buffering) agents; metal complexing (i.e., chelating) agents, such as EDTA or DTPA; emulsifiers; perfumes; and the like.

In an advantageous embodiment of the invention, a 5% by weight suspension of an adhesive remover composition in water has a pH of about 6 to about 8, or between about 6 and about 7. In preferred embodiments, a 5% by weight suspension of an adhesive remover composition in water has a pH essentially the same as the pH of tap water.

In the methods of the invention the substrate to which an adhesive remover composition is applied may be any hard, smooth surface that has an adhesive residue on it, especially a pressure sensitive adhesive used to adhere decals or appliqués on vehicles, e.g., cars, trucks, buses, and aerospace vehicles including airplanes. Additional examples of pressure sensitive adhesive applications include safety labels for power equipment, foil tape for HVAC duct work, automotive interior trim assembly, and sound/vibration damping films. Still further example applications include residues from carpet and wallpaper.

In an advantageous embodiment, the substrate is an epoxy graphite composite material, such as the exterior surface of an aerospace vehicle. Such aerospace applications also include the maintenance and service of appliqué systems, including an airplane appliqué lightning protection system that uses layers of flexible fluorocarbon sheet material applied to critical wing areas with pressure sensitive adhesives. Whereas tape is usually intended for short-term use where a medium adhesive bond is complimentary with ease of removal. But an appliqué is often intended as a permanent part of an aircraft, and it must have very strong adhesive bonds, with ease of removal being a secondary concern. During the operational life of the aircraft, an appliqué system may have to be partially or totally removed and re-installed. Removal of appliqué sheets leaves large quantities of adhesive residues over large surface areas of the primed composite surface. These residues must be removed, prior to re-installation of an appliqué system by an efficient, ergonomic, environmentally friendly, and cost effective process that does not damage the aircraft. The present invention provides a gel or paste adhesive remover composition that does not damage, attack, or degrade primers, paints, sealants, aluminum, or other materials of an airplane.

EXAMPLES

Example 1

Appliqué Adhesive Residue

A Hansen Profile was generated by determining the "Softening Index" (S.I.) for an array of solvents. The S.I. is a relative measure of the response of an adhesive residue to a set of standard solvents selected to represent a range of total Hansen Solubility Parameters (δt). Although certain chlorinated test solvents were used in this analysis, they are not preferred for use in the adhesive remover compositions of the invention because they present undesirable waste-disposal and safety issues. An adaptation of ASTM Standard Test Method D 4752-03 was used to determine the Softening Index for softening the residue from an appliqué system.

Briefly, an acrylic-based pressure sensitive adhesive residue was applied to a substrate made of a carbon-composite material, and then a predetermined quantity of several test solvents were applied to portions of the adhesive residue. A scraping tool, such as a metal spatula or knife, was used to scrape the adhesive residue while applying constant and reproducible amounts of pressure. The relative number of strokes or scraping motions required remove the adhesive residue and expose the cleaned substrate was measured, and the relative Softening Index (i.e., the number of strokes for the solvent being tested) was recorded. See Table, below, particularly the "Appliqué" column. A solvent that has an S.I. of 300 has essentially no effect on the adhesive residue, and lower S.I. values are associated with solvents that are more able to soften the adhesive residue.

TABLE

Softening Index vs. Standard Solvents for Appliqué Adhesive Residue

| TEST SOLVENT | δd | δp | δh | δt | S.I. Appliqué | S.I Tape |
|---|---|---|---|---|---|---|
| tetraethylorthosilicate | 13.9 | 4.3 | 0.6 | 14.6 | 300 | 128 |
| 1,1,2-trichlorotrifluoroethane | 14.7 | 1.6 | 0.0 | 14.8 | 125 | 175 |
| hexane | 14.9 | 0.0 | 0.0 | 14.9 | 300 | 35 |
| heptane | 15.3 | 0.0 | 0.0 | 15.3 | 300 | 35 |
| iso-octane | 15.5 | 0.0 | 0.0 | 15.5 | 300 | 68 |
| decane | 15.7 | 0.0 | 0.0 | 15.7 | 300 | 90 |
| cyclohexane | 16.8 | 0.0 | 0.2 | 16.8 | 250 | 53 |
| methyl isobutyl ketone | 15.3 | 6.1 | 4.1 | 17.0 | 33 | 140 |
| triethylamine | 17.8 | 0.4 | 1.0 | 17.8 | 60 | 54 |
| xylene | 17.6 | 1.0 | 3.1 | 17.9 | 42 | 62 |
| naphtha (high-flash) | 17.9 | 0.7 | 1.8 | 18.0 | 75 | 54 |
| ethyl acetate | 15.8 | 5.3 | 7.2 | 18.2 | 3 | 111 |
| toluene | 18.0 | 1.4 | 2.0 | 18.2 | 23 | 25 |
| methyl n-propyl ketone | 16.0 | 7.6 | 4.7 | 18.3 | 5 | 140 |
| chloroform | 17.8 | 3.1 | 5.7 | 18.9 | 35 | 35 |
| methyl ethyl ketone | 16.0 | 9.0 | 5.1 | 19.1 | 15 | 300 |
| tetrachloroethylene | 18.3 | 5.7 | 0.0 | 19.2 | 140 | 24 |
| tetrahydrofuran | 16.8 | 5.7 | 8.0 | 19.5 | 3 | 55 |
| acetone | 15.5 | 10.4 | 7.0 | 19.9 | 5 | 300 |
| methylene dichloride | 18.2 | 6.3 | 6.1 | 20.2 | 33 | 30 |
| diethyleneglycol monobutylether (butylcellosolve) | 16.0 | 7.0 | 10.6 | 20.4 | 60 | 300 |
| iso-octanol | 17.0 | 3.3 | 11.9 | 21.0 | 30 | 300 |
| 2-butanol | 15.8 | 5.7 | 14.5 | 22.2 | 70 | 300 |
| nitroethane | 16.0 | 15.5 | 4.5 | 22.7 | 70 | 300 |
| N-methyl-2-pyrrolidone (trs80) | 18.0 | 12.3 | 7.2 | 23.0 | 60 | 300 |
| 2-propanol | 15.8 | 6.1 | 16.4 | 23.6 | 50 | 300 |
| benzylalcohol | 18.4 | 6.3 | 13.7 | 23.8 | 60 | 300 |
| ethanol | 15.8 | 8.8 | 19.4 | 26.5 | 70 | 300 |
| methanol | 15.1 | 12.3 | 22.3 | 29.6 | 30 | 300 |
| ethyleneglycol | 17.0 | 11.0 | 26.0 | 33.0 | 300 | 300 |
| glycerol | 17.4 | 12.1 | 29.3 | 36.2 | 300 | 300 |
| triethanolamine | 17.3 | 22.4 | 23.3 | 36.7 | 300 | 300 |
| water | 15.5 | 16.0 | 42.3 | 47.8 | 300 | 300 |

δd = contribution from molecular cohesion effects
δp = contribution from molecular polarity effects
δh = contribution from hydrogen bonding (electron sharing) effects
δt = total Hansen Solubility Parameter = $\sqrt{(\delta d^2+\delta p^2+\delta h^2)}$ A plot of Softening Index as a function of the total Hansen Solubility Parameter (δt, "HSP") for each solvent tested is the Hansen Profile of the Appliqué system. The Hansen Profile for the test Appliqué shows that virtually all solvents effective on this residue have a HSP between about 18 and about 24, with the most effective solvents grouped in a cluster centered at about 19. In an embodiment of the invention, solvents for use in an adhesive remover composition for use in aerospace applications each have an HSP of about 18 to about 20. The Hansen Profile also shows that the adhesive is very resistant to solvents with HSP numbers around 14 to 15, which is in the range of jet fuel hydrocarbon components.

An example adhesive remover composition for use in aerospace applications comprises isopropanol and methyl propyl ketone, which are compatible with graphite composite material. Isopropanol (HSP=23.6) was selected to be the major solvent component because it presents the least industrial hygiene concerns with a smaller amount of methyl propyl ketone (HSP=18.3), which is very effective at removing heat hardened and aged adhesive residues. Fumed silica, selected as the thickening agent, was mixed into a 90-10 mixture by volume of isopropanol and methyl propyl ketone. Silica was added to give a thin paste of sufficient consistency to adhere to a vertical surface, about 25 on the Gardiner Viscosity Scale. About 3% by volume of glycerin was blended into the mixture to retard the evaporation of primary solvents by reducing total vapor pressure and also prevent the mixture from totally drying out on long standing. An ethanol/water solution of methylene blue was added to give a sky blue color. In this case the dye is preferentially absorbed by the adhesive and thus functions as an inspection aid for detection of remaining adhesive traces. Liquid dish washing detergent, with incorporated liquid soap and surfactant packages, were added to the mixture until a smooth uniform gel was achieved. If the gel is to be used on a pH sensitive or corrodible surface, 2% by volume of standard buffer solution in the desired pH range can be added. A pH modifier is not required in this case because the stripper is intended strictly of graphite composites and associated finishes. The mixture was tested for adherence to vertical and overhead surfaces, and adjusted with silica or isopropanol as required.

Example 2

Tape Adhesive Residue

An adhesive remover composition for removing tape residue was prepared in accordance with the principles of the invention. The Softening Index for GORILLA TAPE® was determined using the method described herein above. See the “Tape” column of the Table, above. GORILLA TAPE®, a trademark of The Gorilla Glue Company of Cincinnati, Ohio, is a tape with a pressure sensitive adhesive comprising polyolefins, as well as natural and synthetic rubbers.

An excess of each test solvent was applied to a grid square and the number of even strokes of a scraping tool was counted to give a total removal of adhesive down to the cloth backing of the tape. The number of strokes required is the “Softening Index” for the test solvent. A plot of Softening Indices as a function of total Hansen Solubility Parameters for each solvent tested with GORILLA TAPE® is the Hansen Profile for this adhesive system, which demonstrates that the most effective solvents. The Hansen Profile for GORILLA TAPE® shows that virtually all solvents effective on this residue have an HSP value between about 14 and about 19.

A 95-5 mixture of high flash aliphatic naptha (HSP=18.0) and toluene (HSP=18.2) was chosen as the primary solvent system for this example adhesive remover composition. Naptha was chosen because it already in common usage in paint hangars and other aircraft manufacturing operations. The toluene component is added to attack aged and potentially heat-hardened residues. Fumed silica, a thickening agent, was stirred into a 95-5 mixture by volume of aliphatic naptha and toluene. Small amounts of silica and naptha were added to adjust viscosity to give a paste of sufficient consistency to adhere to a vertical surface. This is usually about 25 on the Gardiner Viscosity Scale. Glycerin, 1% by volume, was blended into with the mixture to retard the evaporation of primary solvents by reducing total vapor pressure in order to prevent the mixture from totally drying out on long standing, thereby extending the working life of the material. A methylene blue solution in water/ethanol was added to impart a light blue color. The dye is preferentially absorbed by the adhesive and also thus functions as an inspection aid for detection of remaining adhesive residues. A commercial detergent, with an incorporated surfactant/liquid soap package, was added and blended in to give a smooth gel consistency. A 1% by volume of pH 7 buffer solution (monobasic potassium phosphate and disodium phosphate) was added to retard corrosion of sensitive clad aluminum surfaces. The mixture was tested for adherence to vertical and overhead surfaces. Viscosity was adjusted with silica and naptha as required. The adhesive remover composition was tested on aged and hardened GORILLA TAPE® residue on aluminum, and the adhesive remover composition was shown to incorporate tape residues.

While the invention has been described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

The invention claimed is:

1. A method of removing adhesive residue from a substrate comprising the steps of providing an adhesive remover composition comprising one or more non-halogenated organic solvents being a primary solvent component, a non-abrasive thickening agent, a surfactant, a vapor-pressure modulating agent, and an absorbable indicator dye, wherein the total Hansen Solubility Parameter at 25° C. for each of the non-halogenated organic solvents is from about 14 $MPa^{1/2}$ to about 24 $MPa^{1/2}$;

applying said adhesive remover composition to a substrate that has an adhesive residue adhering thereto;

permitting a sufficient amount of time to lapse during which the adhesive residue becomes incorporated into the adhesive remover composition, but not so long that the adhesive remover composition becomes substantially dry;

removing the adhesive remover composition to produce a cleaned substrate; and inspecting the cleaned substrate for the presence removal of adhesive residue;

wherein the step of permitting a sufficient amount of time to lapse during which the adhesive residue becomes incorporated into the adhesive remover composition further includes permitting a sufficient amount of time to lapse for the absorbable indicator dye to absorb into or onto the adhesive residue.

2. The method of claim 1 wherein the step of providing an adhesive remover composition further includes providing a composition wherein the total Hansen Solubility Parameter at 25° C. for each of the non-halogenated organic solvents is from about 14 $MPa^{1/2}$ to about 19 $MPa^{1/2}$.

3. The method of claim 1 wherein the step of providing an adhesive remover composition further includes providing a composition wherein the total Hansen Solubility Parameter at 25° C. for each of the non-halogenated organic solvents is from about 18 $MPa^{1/2}$ to about 20 $MPa^{1/2}$.

4. The method of claim 1 wherein the step of inspecting the cleaned substrate further includes visually inspecting the substrate for the presence of the absorbable indicator dye.

5. The method of claim 1 wherein the step of permitting a sufficient of amount of time to lapse is about 10 minutes.

6. The method of claim 1 wherein the step of permitting a sufficient of amount of time to lapse is about 20 minutes.

7. The method of claim 1 wherein the step of permitting a sufficient of amount of time to lapse is about 30 minutes.

8. The method of claim 1 further comprising a step of washing the cleaned substrate with an aqueous solution.

9. The method of claim 8 wherein the step of washing the cleaned substrate with an aqueous solution includes the aqueous solution of water and dish washing detergent.

10. The method of claim 1 further comprising a step of washing the cleaned substrate with a non-aqueous solution.

11. The method of claim 1, wherein the substrate is an epoxy graphite composite material.

12. The method of claim 1, wherein the substrate is the exterior surface of an aerospace vehicle.

13. The method of claim 1 further including a step, after applying the adhesive remover composition to the substrate, of covering the coated substrate with a drop cloth.

14. The method of claim 1 wherein the step of removing the adhesive remover composition further includes scraping the substrate using a scraping tool.

15. The method of claim 1 wherein the step of removing the adhesive remover composition further includes scrubbing the substrate with a non-abrasive scrubbing pad.

16. The method of claim 1 wherein the step of applying the adhesive remover composition includes applying the adhesive composition by spraying the substrate.

17. The method of claim 16 wherein the step of applying the adhesive remover composition is by spraying the substrate with an airless paint gun.

* * * * *